(12) United States Patent
Gondo et al.

(10) Patent No.: US 7,730,226 B2
(45) Date of Patent: Jun. 1, 2010

(54) MULTIPLE PROTOCOL ADDRESS REGISTER METHOD, MULTIPLE PROTOCOL ADDRESS REGISTER SYSTEM, MULTIPLE PROTOCOL ADDRESS REGISTER SERVER, AND MULTIPLE PROTOCOL ADDRESS COMMUNICATION TERMINAL

(75) Inventors: Shunichi Gondo, Tokyo (JP); Mitsuru Kanda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 11/456,268

(22) Filed: Jul. 10, 2006

(65) Prior Publication Data

US 2007/0013946 A1    Jan. 18, 2007

(30) Foreign Application Priority Data

Jul. 14, 2005    (JP)    ............................. 2005-206042

(51) Int. Cl.
     *G06F 3/00*    (2006.01)

(52) U.S. Cl. ................. 710/9; 710/8; 710/11; 710/104; 710/105; 709/220; 709/222; 709/225; 713/168; 358/1.15

(58) Field of Classification Search ................. 709/225, 709/220, 222; 710/8, 9, 11, 104, 105; 713/168
See application file for complete search history.

(56) References Cited

U.S. PATENT DOCUMENTS

| | | | | |
|---|---|---|---|---|
| 2002/0065806 A1* | 5/2002 | Kim | ................................ | 707/1 |
| 2003/0126262 A1* | 7/2003 | Yoshida et al. | ............... | 709/226 |
| 2003/0212774 A1* | 11/2003 | Lee et al. | ..................... | 709/222 |
| 2004/0051900 A1* | 3/2004 | Sagiya et al. | ............... | 358/1.15 |
| 2005/0177722 A1* | 8/2005 | Vaarala et al. | ............... | 713/168 |
| 2006/0212549 A1* | 9/2006 | Hokkyo et al. | .............. | 709/220 |
| 2006/0259583 A1* | 11/2006 | Matsuura | ..................... | 709/218 |

(Continued)

FOREIGN PATENT DOCUMENTS

| | | | |
|---|---|---|---|
| JP | 09261274 A | * | 10/1997 |
| JP | 10271117 A | * | 10/1998 |

OTHER PUBLICATIONS

'Oracle Database Net Services Administator's Guide 10g Release 1' by Oracle, Jan. 2004.*

(Continued)

*Primary Examiner*—Henry W. H. Tsai
*Assistant Examiner*—Steven G Snyder
(74) *Attorney, Agent, or Firm*—Oblon, Spivak, McClelland, Maier & Neustadt, L.L.P.

(57) ABSTRACT

A multiple protocol address register method between a communication terminal and the register server includes transmitting a first register request for requesting to register a first protocol address from the communication terminal to the register server; storing the first protocol address and the identification to the register server; transmitting a response to the first register request from the register server to the communication terminal together with a first communication rule; transmitting the second register request from the communication terminal to the register server on the basis of the first communication rule; storing, when the second register request is created based on the first communication rule, the second protocol address in the register server; and transmitting a response to the second register request from the register server to the communication terminal.

19 Claims, 6 Drawing Sheets

U.S. PATENT DOCUMENTS

2007/0133803 A1* 6/2007 Saito et al. .................. 380/267
2007/0217408 A1* 9/2007 Sahashi et al. .............. 370/389

OTHER PUBLICATIONS

'What is SIP Introduction' by SIP Center, www.sipcenter.com, Jul. 11, 2004.*

'Security Mechanism Agreement for the Session Initiation Protocol (SIP)' by Arkko et al., Jan. 2003.*

J. Arkko, et al., "Security Mechanism Agreement for the Session Initiation Protocol (SIP)", Network Working Group, Request for Comments: 3329, Category: Standards Track, IETF, Jan. 2003, pp. 1-24.

* cited by examiner

MULTIPLE PROTOCOL ADDRESS REGISTER METHOD, MULTIPLE PROTOCOL ADDRESS REGISTER SYSTEM, MULTIPLE PROTOCOL ADDRESS REGISTER SERVER, AND MULTIPLE PROTOCOL ADDRESS COMMUNICATION TERMINAL

CROSS-REFERENCE TO RELATED APPLICATION

This application is based upon and claims the benefit of priority from the prior Japanese Patent Applications No. 2005-206042, filed on Jul. 14, 2005, the entire contents of which are incorporated herein by reference.

BACKGROUND OF THE INVENTION

1. Field of the Invention

The present invention relates to a multiple protocol address register method, a multiple protocol address register system, a multiple protocol address register server, and a multiple protocol address communication terminal.

2. Related Art

Recently, there is widely used Internet Protocol such as IPv6 (Internet Protocol Version 6) and the like which permits one communication terminal having a plurality of protocol addresses to carry out a communication to other communication terminal by appropriately using the protocol addresses. Conventionally, each communication terminal, which has a plurality of the protocol addresses, registers each of the protocol addresses owned by the communication terminal independently to a register server such as a proxy sever that manages the protocol addresses of the communication terminals.

However, when each of the plurality of protocol addresses of a communication terminal is registered independently as described above, a problem arises in that even if the protocol addresses are owned by a plurality of different communication terminals at the same time, it is possible to assume at the register server that the protocol addresses that are owned by a plurality of different communication terminals are in fact owned by the same communication terminal.

That is, there will be examined a case in which the protocol addresses of two communication terminals are independently registered to a register server in, for example, SIP (Session Initiation Protocol: refer to, for example, RFC 3329 Security Mechanism Agreement for the Session Initiation Protocol (SIP) January 2003 which is called a non-patent document 1 hereinafter) as if they are the protocol addresses owned by one communication terminal using one identification ID permitted to a user to access the register server. In this case, since the register server registers the protocol addresses of the two different communication terminals by relating them to a single identification ID given to the user, the user can access the register server from the two communication terminals using the same identification ID. When such an access is possible, the protocol addresses of the two different communication terminals can be registered by being related to the one identification ID, even if the protocol addresses are owned by different communication terminals at the same time. Therefore, even if the register server is actually accessed by the two different communication servers simultaneously, a manager of the register server cannot know this fact regardless that he or she intends to manage the accesses to the register server in, for example, a unit of each communication terminal (for the purpose of for example, accounting).

Further, when, for example, a user communicates with the register server using only one protocol address, it is also possible for a vicious third-person to steal the identification ID of the user and to register the protocol address of an additional communication terminal using the identification ID as if it is the protocol address of the communication terminal of the user who communicates with the register server, from which a problem of security arises.

As described above, conventionally, when a communication terminal having a plurality of protocol addresses registers the protocol addresses to the register server, the communication terminal registers each of the protocol addresses owned by the communication terminal independently. As a result, it is possible to assume to the register server as if the protocol addresses owned by a different communication terminal are owned by the same communication terminal, from which a problem may be arisen in the management of access and in the security of communication.

An object of the present invention, which was made to solve the conventional problems described above, is to provide a multiple protocol address register method, a multiple protocol address register system, a multiple protocol address register server, and a multiple protocol address register server that can prevent to assume to a register server as if the protocol addresses of a plurality of different communication terminals belong to the same one communication terminal.

SUMMARY OF THE INVENTION

A multiple protocol address register method between a register server and a communication terminal, which has an identification used to access the register server, according to an embodiment of the present invention, the method comprises transmitting a first register request for requesting to register a first protocol address using the identification of the communication terminal from the communication terminal to the register server; storing the first protocol address and the identification to the register table of the register server, the first protocol address being related to the identification; transmitting a response to the first register request from the register server to the communication terminal together with a first communication rule, on which the communication terminal is to be based in a second register request for requesting to register a second protocol address of the communication terminal; transmitting the second register request from the communication terminal to the register server on the basis of the first communication rule; storing, when the second register request is created based on the first communication rule, the second protocol address to the register table of the register server, the second protocol address being related to the identification; and transmitting a response to the second register request from the register server to the communication terminal.

A multiple protocol address register method between a register server and a communication terminal, which has an identification used to access the register server, according to an embodiment of the present invention, the method comprises transmitting a first register request for requesting to register a first protocol address using the identification of the communication terminal from the communication terminal to the register server together with a communication rule, on which the register server is to be based in a response to a second register request for requesting to register a second protocol address of the communication terminal; storing the first protocol address and the identification to the register table of the register server, the first protocol address being related to the identification; transmitting a response to the first register request from the register server to the communication terminal; transmitting the second register request from the communication terminal to the register server; storing the second protocol address and the identification to the register table of the register server, the second protocol address being related to the identification; and transmitting a response to the second register request created based on the communication rule from the register server to the communication terminal.

A multiple protocol address register method between a SIP (Session Initiation Protocol) server including at least a register server and a user agent, which has an identification used to access the SIP server, according to an embodiment of the present invention, the method comprises transmitting a first register request for requesting to register a first protocol address using the identification of the user agent from the user agent to the SIP server; storing the first protocol address and the identification to the register table of the SIP server, the first protocol address being related to the identification; transmitting a response to the first register request from the SIP server to the user agent together with a first communication rule, on which the user agent is to be based in a second register request for requesting to register a second protocol address using the identification; transmitting the second register request from the user agent to the SIP server on the basis of the first communication rule; storing, when the second register request is created based on the first communication rule, the second protocol address to the register table of the SIP server, the second protocol address being related to the identification; and transmitting a response to the second register request from the SIP server to the user agent.

A multiple protocol address register system comprising a register server and a communication terminal, which has an identification used to access the register server, according to an embodiment of the present invention, the communication terminal comprises a memory storing a first protocol address and a second protocol address; a transmitter transmitting a first register request for requesting to register a first protocol address using the identification to the register server; a receiver receiving a response to the first register request from the register server to the communication terminal together with a communication rule, on which the communication terminal is to be based in a second register request for requesting to register a second protocol of the communication terminal, wherein the transmitter of the communication terminal transmits the second register request from the communication terminal to the register server on the basis of the communication rule, and the register server comprises a receiver receiving the first register request transmitted from the communication terminal; a memory storing the first protocol address and the identification to the register table, the first protocol address being related to the identification; a transmitter transmitting a response to the first register request from the register server to the communication terminal together with a communication rule, on which the communication terminal is to be based in the second register request, wherein the receiver of the register server receives the second register request, the memory of the register server stores, when the second register request is created based on the communication rule, the second protocol address and the identification to the register table after the second protocol address being related to the identification, and the transmitter of the register server transmits a response to the second register request from the register server to the communication terminal.

A multiple protocol address register server according to an embodiment of the present invention comprises a receiver receiving a first register request for requesting to register a first protocol address transmitted from a communication terminal; a memory storing the first protocol address and an identification of the communication terminal to the register table, the first protocol address being related to the identification; a transmitter transmitting a response to the first register request from the register server to the communication terminal together with a communication rule, on which the communication terminal is to be based in a second register request for requesting to register a second protocol address of the communication terminal, wherein the receiver receives the second register request transmitted from the communication terminal, the memory stores, when the second register request is created based on the communication rule, the second protocol address and the identification to the register table, the second protocol address being related to the identification, and the transmitter transmits a response to the second register request from the register server to the communication terminal.

A multiple protocol address communication terminal according to an embodiment of the present invention comprises a memory storing a first protocol address and a second protocol address and storing an identification used to access a register server; a transmitter transmitting a first register request from the communication terminal to the register server for requesting to register a first protocol address; a receiver receiving a response to the first register request from the register server together with a communication rule, on which the communication terminal is to be based in a second register request for requesting to register a second protocol address of the communication terminal, wherein the transmitter transmits the second register request to the communication terminal on the basis of the communication rule.

DETAILED DESCRIPTION OF THE INVENTION

Embodiments of the present invention will be described below.

First Embodiment

A first embodiment will describe a case in which a user agent (hereinafter, abbreviated as "UA") issues a REGISTER request for the protocol address thereof to an SIP server including at least a register server according to SIP (Session Initiation Protocol).

Figure 1:
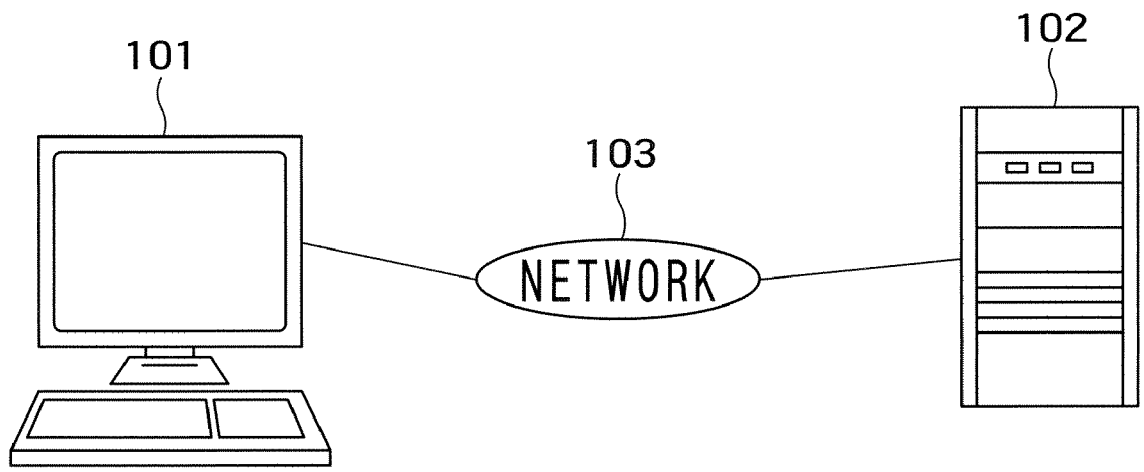
FIG. 1 is a configurational view showing a communication system according to the first embodiment.

FIG. 1 shows a communication system according to the first embodiment.

The communication system according to the first embodiment includes a UA 101 having a first protocol address (IPv4 address) and a second protocol address (IPv6 address) and an SIP server 102 connected to the UA 101 through a network 103 such as the Internet, a local area network, and the like. Further, the UA 101 has an identification ID previously given to each UA (or the user of the UA) and used to access the SIP server 102. The UA 101 issues the REGISTER request for a protocol address to the SIP server 102 using the identification ID.

Figure 2:
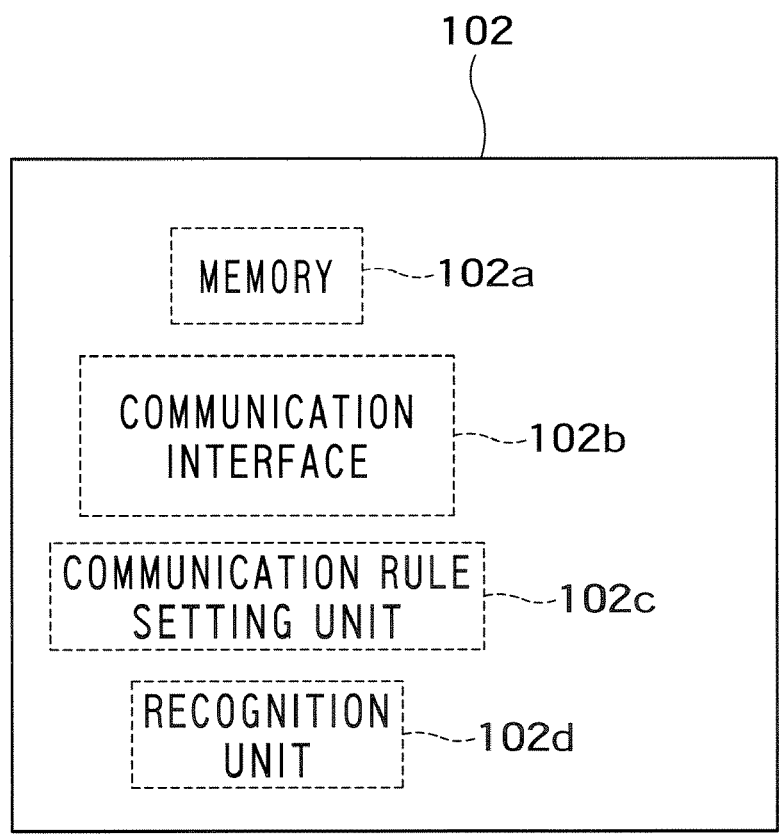
FIG. 2 is a configurational view showing a SIP server according to the first embodiment.

In the communication carried out according to SIP, the identification ID is an SIP-URI (Uniform Resource Identifiers) given to each UA. Further, as shown in FIG. 2, the SIP server 102 includes a memory 102a, a communication interface 102b for carrying out a data communication between it and the UA, a communication rule setting unit 102c for setting a communication rule, and an authentication unit 102d for determining whether or not a signal transmitted from a UA is based on a communication rule. A protocol address management table is stored in the memory of the SIP server 102 to store the identification ID and the protocol address of a UA after they are related to each other in response to the REGISTER request for a protocol address using the identification ID issued from a UA. Note that it is sufficient to realize the communication rule setting unit 102C and the authentication unit 102d of the SIP server 102 by causing a CPU (not shown) of the SIP server 102 to execute a program.

Figure 3:
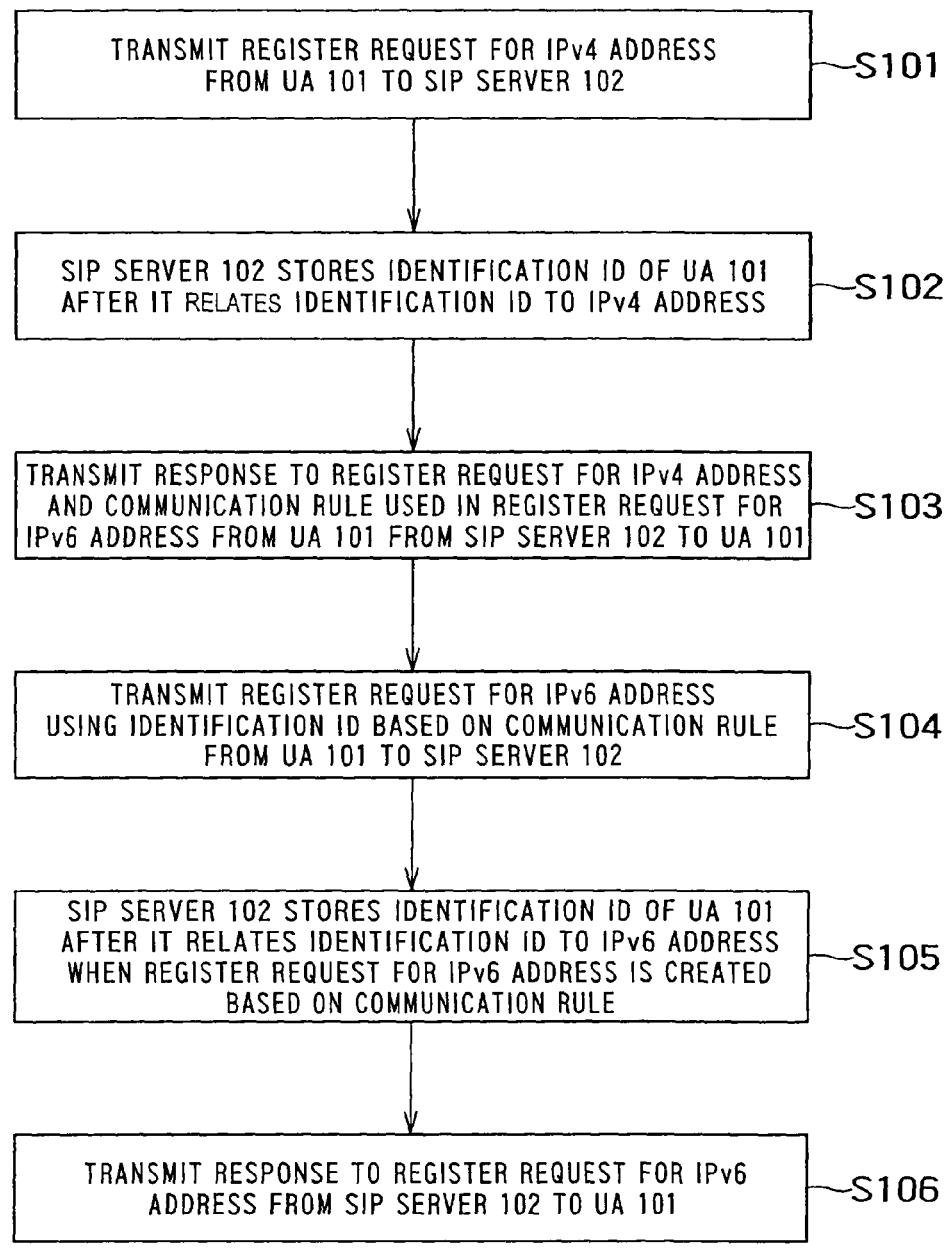
FIG. 3 is a flowchart showing the operation of the communication system according to the first embodiment.

Next, an operation of the communication system of the first embodiment will be described referring FIGS. 1 to 3. Note that FIG. 3 is a flowchart showing the operation of the communication system according to the first embodiment of the present invention.

First, the UA 101 transmits the REGISTER request for an IPv4 address to the SIP server 102 using the identification ID given to thereto (step S101). A message format of the REGISTER request for a protocol address to the SIP server 102 may be written by a message format of SIP. That is, it is sufficient to describe that transmitted data requests to register a protocol address (REGISTER), the protocol address required to be registered, the protocol address of a UA to which data is transmitted, and the like in a header portion or in a body portion of the transmitted data (refer to for example, the Chapter "10.2 Constructing the REGISTER Request", page 56 of a non-patent document 1).

The SIP server 102 receives the REGISTER request for the IPv4 address from the UA 101 and registers the IPv4 address and the identification ID to the protocol address management table after the SIP server 102 relates the IPv4 address to the identification ID (step S102).

When the IPv4 address of the UA 101 is registered to the SIP server 102, the SIP server 102 transmits a response to the UA 101 to notify it that the register of the IPv4 address is completed (for example, response 2000K). When the response is transmitted, the SIP server 102 sets a communication rule, on which the UA 101 is to be based in the REGISTER request for an IPv6 address using the identification ID given to the UA 101, by the communication rule setting unit 102c and transmits the set communication rule together with the response (step S103). The communication rule on which the UA 101 is to be based in the REGISTER request for the IPv6 address is, for example, to transmit a REGISTER request signal after it is coded by a particular encryption method, to transmit a REGISTER request message with a particular key word contained therein, and the like. Note that it is sufficient that the communication rule is described in a header portion of a response message according to the message format of SIP. When it is indicated by the communication rule to transmit the REGISTER request signal after it is coded by the particular encryption method, a code key used to the coding, for example, is described in the header portion of the response message.

Further, the communication rule may be set by the communication rule setting unit 102c in, for example, such a manner that a plurality of communication rule (for example, code keys) are previously stored in the memory 102a of the SIP server 102 and one of them is read out for use or a new communication rule (for example, code key) is created for use each time the REGISTER request for an IP address is received from the UA 101.

When the communication rule, on which the UA 101 is to be based in the REGISTER request for the IPv6 address using the identification ID given to the UA 101, is transmitted together with the response to the REGISTER request for the IPv4 address, a UA that can know the communication rule is only the UA 101 which previously issued the REGISTER request for the IPv4 address using the identification ID given to the UA 101. Accordingly, even if a UA other than the UA 101 issues the REGISTER request for the IPv6 address using the identification ID of the UA 101, the REGISTER request is rejected by the SIP server 102 at the following steps.

The UA 101, which receives the response to the REGISTER request for the IPv4 address from the SIP server 102, then stores the communication rule received from the SIP server 102 to a buffer (not shown). Then, the UA 101 transmits the REGISTER request for the IPv6 address using the identification ID to the SIP server 102 based on the communication rule (step S104).

The SIP server 102 receives the REGISTER request for the IPv6 address using the identification ID from the UA 101. When the REGISTER request is created based on the communication rule transmitted at step S103, the SIP server 102 registers the identification ID and the IPv6 address to the protocol address management table after the SIP server 102 relates the IPv6 address to the identification ID (step S105). When the REGISTER request is not created based on the communication rule, the SIP server 102 revokes the REGISTER request without registering the IPv6 address the register of which is requested to the protocol address management table. That is, respective protocol addresses and the identification ID given to the UA 101 are registered to the SIP server 102 after they are related to each other only when a UA issued the REGISTER request for the IPv4 address is the same UA as a UA issued the REGISTER request for the IPv6 address.

When the communication rule prescribes to, for example, transmit the REGISTER request signal after it is coded by the particular encryption method, whether or not the REGISTER request in the SIP server 102 is created based on the communication rule may be determined by decoding the REGISTER request signal from the UA 101 according to a designated encryption method in the authentication unit 102d of the SIP server 102 and by determining whether or not the signal can be decoded by the system. Further, when, for example, the communication rule prescribes to contain the particular keyword in the REGISTER request message, it is determined by determining whether or not the designated keyword is contained in the message in the authentication unit 102d.

Next, the SIP server 102 transmits a response to the REGISTER request for the IPv6 address to the UA 101 (step S106).

As described above, according to the communication apparatus according to the first embodiment of the present invention, when the SIP server 102 transmits the response to the REGISTER request for the IPv4 address using the identification ID, it also transmits the communication rule of the REGISTER request for the IPv6 address using the identification ID of the UA 101 to the UA 101 issued the REGISTER request. Then, the IPv6 address and the identification ID are registered after they are related to each other only when the REGISTER request for the IPv6 address using the identification ID of the UA 101 is created based on the communication rule. With this arrangement, the SIP server 102 can register the identification ID given to the UA 101 and the respective protocol addresses to the protocol address management table after they are related to each other only when the UA issued the REGISTER request for the IPv4 address is the same as the UA issued the REGISTER request for the IPv6 address. More specifically, even if a UA different from the UA 101 intends to register the IPv6 address using the identification ID given to the UA 101, since the REGISTER request is rejected by the SIP server 102, the IPv6 address is not registered to the protocol address management table of the SIP server 102. Accordingly, since it can be prevented that the IPv4 address and the IPv6 address of different UAs are registered to the SIP server 102 using the same identification ID. As a result, the protocol addresses of different UAs can be prevented from being registered to the SIP server 102 by a vicious third-person who assumes as if they belong to the same UA.

Note that the first embodiment described above may be arranged such that when the UA 101 does not transmit the REGISTER request for IPv6 address created based on the communication rule to the SIP server 102 within a predetermined period of time after the UA 101 receives the response to the REGISTER request for the IPv4 address from the SIP server 102, the SIP server 102 rejects the REGISTER request for the IPv6 address. When a limit is set to the period of time from the time the response to the REGISTER request for the IPv4 address is transmitted to the time the REGISTER request for the IPv6 address is issued, even if the communication rule transmitted from the SIP server 102 to the UA 101 is monitored and analyzed by, for example, a vicious third-person, a period of time required to analyze the communication rule can be reduced, thereby it can be made difficult to transmit a vicious IPv6 address REGISTER request.

Although the first embodiment described above explains the IPv4 address and the IPv6 address as the protocol addresses owned by the UA 101, the protocol addresses owned by the UA 101 may be, for example, two different IPv6 addresses. Further, in the first embodiment described above, the REGISTER request for the IPv4 address is executed first, and then the REGISTER request for the IPv6 address is executed. However, the REGISTER request for IPv6 address may be executed first, and then the REGISTER request for IPv4 address may be transmitted from the UA 101 based on the communication rule transmitted from the SIP server 102 when the response to the REGISTER request for the IPv6 address is transmitted therefrom.

Figure 4:
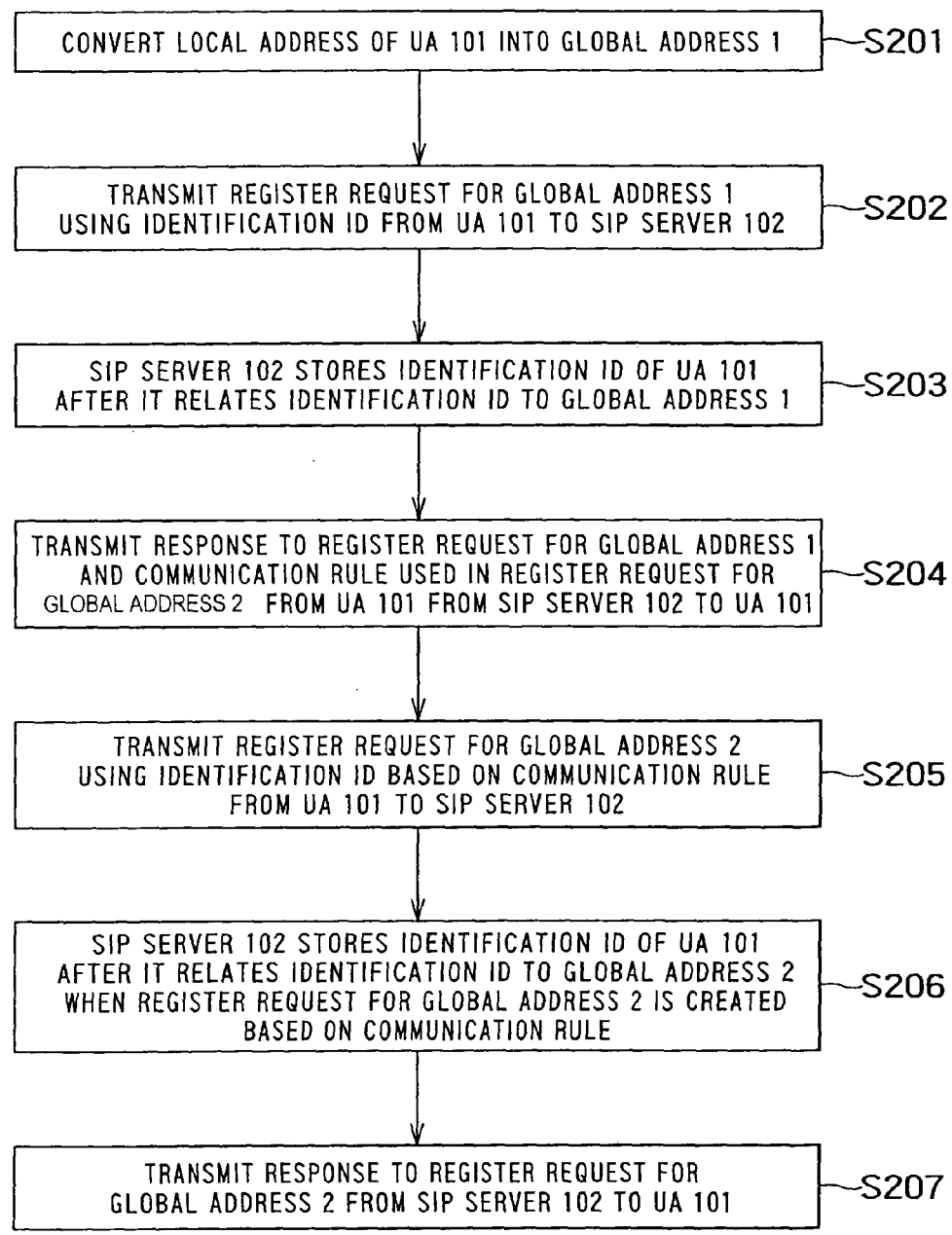
FIG. 4 is a flowchart showing the operation of the communication system according to a modification of the first embodiment.

Further, the protocol addresses owned by of the UA 101 may be a local address and a global address on a local network to which the UA 101 is connected. In this case, as shown in a flowchart of FIG. 4, a step (step S201) is provided to convert the local address into a global address 1 different from a global address 2 owned by the UA 101 by an address converter before the protocol address is transmitted from the UA 101 to the SIP server 102. Then, the converted global address 1 and the identification ID of the UA 101 are registered to the SIP server 102 after they are related to each other.

With this arrangement, it is possible to register the global address 1 converted from the local address owned by the UA 101 and the global address 2 owned by the UA 101 to the SIP server 102 after they are related to the identification ID of the UA 101.

Further, in the first embodiment described above, the SIP server 102 includes at least the register server. However, a proxy server and a redirect server that are necessary in SIP may be operated on the same server as the register server or may be operated on a server different from the register server.

Figure 5:
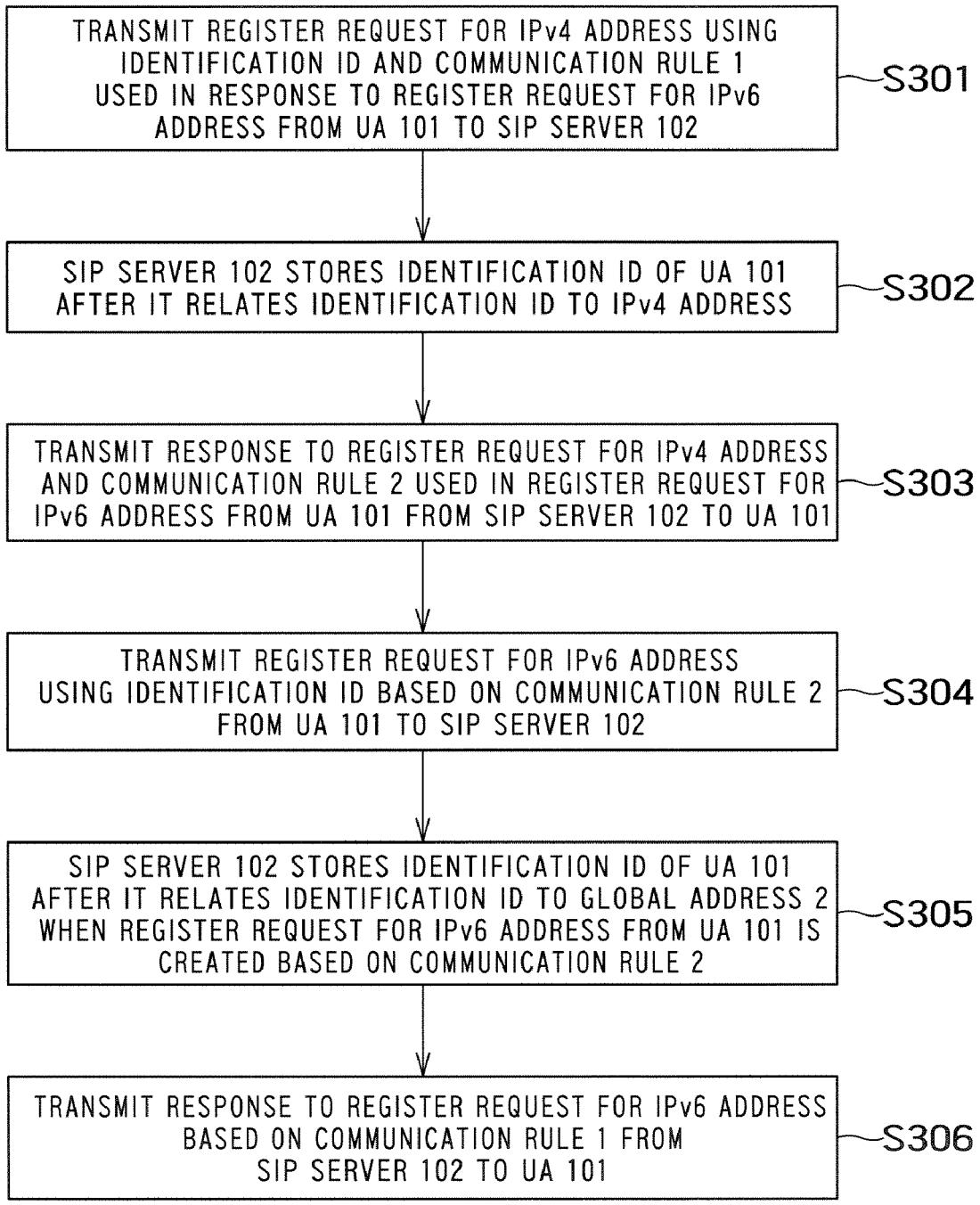
FIG. 5 is a flowchart showing the operation of the communication system according to a modification of the first embodiment.

Further, in the first embodiment described above, when the REGISTER request for the IPv4 address is transmitted from the UA 101 to the SIP server 102, it is possible for the UA 101 to transmit the communication rule, on which the SIP server 102 is to be based when the SIP server 102 transmits the response to the REGISTER request for the IPv6 address from the UA 101, together with the REGISTER request for the IPv4 address. FIG. 5 shows a flowchart of a communication system in this case.

In FIG. 5, the communication rule transmitted from the UA 101 to the SIP server 102 is a communication rule 1, and the communication rule transmitted from the SIP server 102 to the UA 101 is a communication rule 2. At the time, what can know the communication rule 1 transmitted from the UA 101 is only the SIP server 102 that received the REGISTER request for the IPv4 address transmitted from the UA 101 at step S301. Accordingly, when the response to the REGISTER request for the IPv6 address is transmitted from the SIP server 102 to the UA 101 and the response is created based on the communication rule 1 transmitted from the UA 101, the UA 101 can know that the SIP server transmitted the REGISTER request for the IPv4 address is the same as the SIP server transmitted the REGISTER request for the IPv6 address. With this arrangement, when, for example, an SIP server that issues a REGISTER request is not the same SIP server unexpectedly, it is possible to interrupt a subsequent communication.

Further, after the respective protocol addresses of the UA 101 are registered to the SIP server 102, one of a communication channel using the IPv4 address of the UA 101 and a communication channel using the IPv6 address thereof may be maintained. That is, after the SIP server 102 registers the protocol addresses, it provides a signal channel between it and the UA 101 to maintain a communication to each of the registered protocol addresses, and the signal channel is maintained only by the communication channel using any of the protocol addresses of the UA 101. With this arrangement, the number of signal channels to be maintained by the SIP server 102 can be reduced, thereby a load of communication between the SIP server 102 and other UAs can be reduced. Even in this case, when the protocol address is registered at the protocol address register step described above, a communication can be maintained between the SIP server 102 and the UA 101 because it is guaranteed that the registered IPv4 address and IPv6 address belong to the same UA 101.

Second Embodiment

The first embodiment describes the case in which the UA 101 has the two protocol addresses. A second embodiment will describe a case in which a UA 101 has three protocol addresses.

Although a communication system according to the second embodiment is the same as that of the first embodiment shown in FIG. 1, it is assumed that the UA 101 has an additional IPv6 address in addition to an IPv4 address and an IPv6 address. In the following description, these two IPv6 addresses are denoted as an IPv6 address 1 and an IPv6 address 2.

Figure 6:
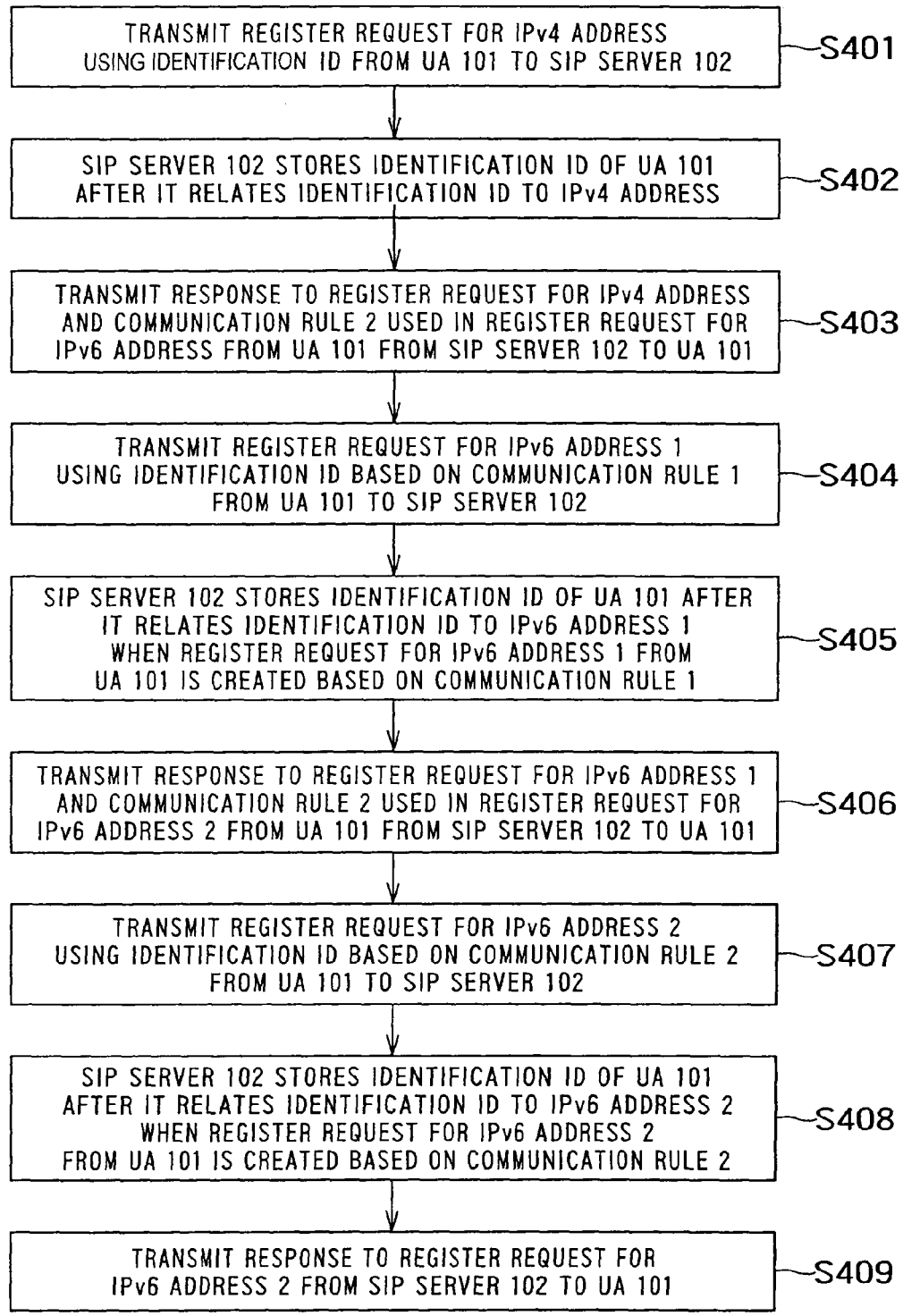
FIG. 6 is a flowchart showing the operation of the communication system according to the second embodiment.

Next, an operation of the communication system according to the second embodiment of the present invention will be described using FIG. 6. Note that FIG. 6 is a flowchart showing the operation of the communication system according to the second embodiment of the present invention. Further, in the following description, the description of operations common to those of the communication system according to the first embodiment of the present invention (steps S401 to S405) is omitted.

When the IPv6 address 1 of the UA 101 is registered to a SIP server 102 at step S405, the SIP server 102 transmits a response to the UA 101 to notify it that the register of the IPv6 address 1 is completed. When the response is transmitted, the SIP server 102 transmits a communication rule 2, on which the UA 101 is to be based in the REGISTER request for the IPv6 address 2 using an identification ID from the UA 101, together with the response (step 406). The communication rule on which the UA 101 is to be based in the REGISTER request for the IPv6 address 2 is, for example, a particular encryption method, a particular key word, and the like to a REGISTER request signal as described above. Further, although the communication rule 2 may be the same as a communication rule 1 transmitted from the SIP server 102 to the UA 101 for the REGISTER request for the IPv6 address 1, it is preferably different from the communication rule 1 to make it difficult for a vicious third-person to analyze the communication rule 2.

As described above, when the communication rule 2, on which the UA 101 is to be based in the REGISTER request for the IPv6 address 2 using the identification ID, is transmitted together with the response to the REGISTER request for the IPv6 address 1, the UA that can know the communication rule 2 is only the UA 101 that issued the REGISTER request for the IPv6 address 1. Accordingly, even if a UA other than the UA 101 issues the REGISTER request for the IPv6 address using the identification ID of the UA 101, the REGISTER request is rejected by the SIP server 102 at the following steps. That is, the identification ID and respective protocol addresses can be registered to the SIP server 102 after they are related to each other only when a UA issued the REGISTER request for the IPv6 address 1 is the same as a UA issued the REGISTER request for the IPv6 address 2.

Next, the UA 101, which receives the response to the REGISTER request for the IPv6 address 1 from the SIP server 102, transmits the REGISTER request for the IPv6 address 2 using the identification ID to the SIP server 102 based on the communication rule 2 received from the SIP server 102 (step S407).

The SIP server 102 receives the REGISTER request for the IPv6 address 2 using the identification ID from the UA 101. When the REGISTER request is created based on the communication rule 2 transmitted at step S406, the SIP server 102 registers the identification ID and the IPv6 address 2 to a protocol address management table after it relates the IPv6 address 2 to the identification ID (step S408). When the REGISTER request is not created based on the communication rule 2, the SIP server 102 revokes the REGISTER request without registering the IPv6 2 address the register of which is requested to the protocol address management table.

Then, the SIP server 102 transmits a response to the REGISTER request for the IPv6 address 2 to the UA 101 (step S409)

As described above, according to the communication system of the second embodiment of the present invention, even when the UA 101 has the three protocol addresses, it is possible to register the identification ID of the UA 101 and the respective protocol addresses to the protocol address management table after they are related to each other only when the same UA issues the REGISTER requests for the IPv4 address, the IPv6 address 1, and the IPv6 address 2.

Figure 7:
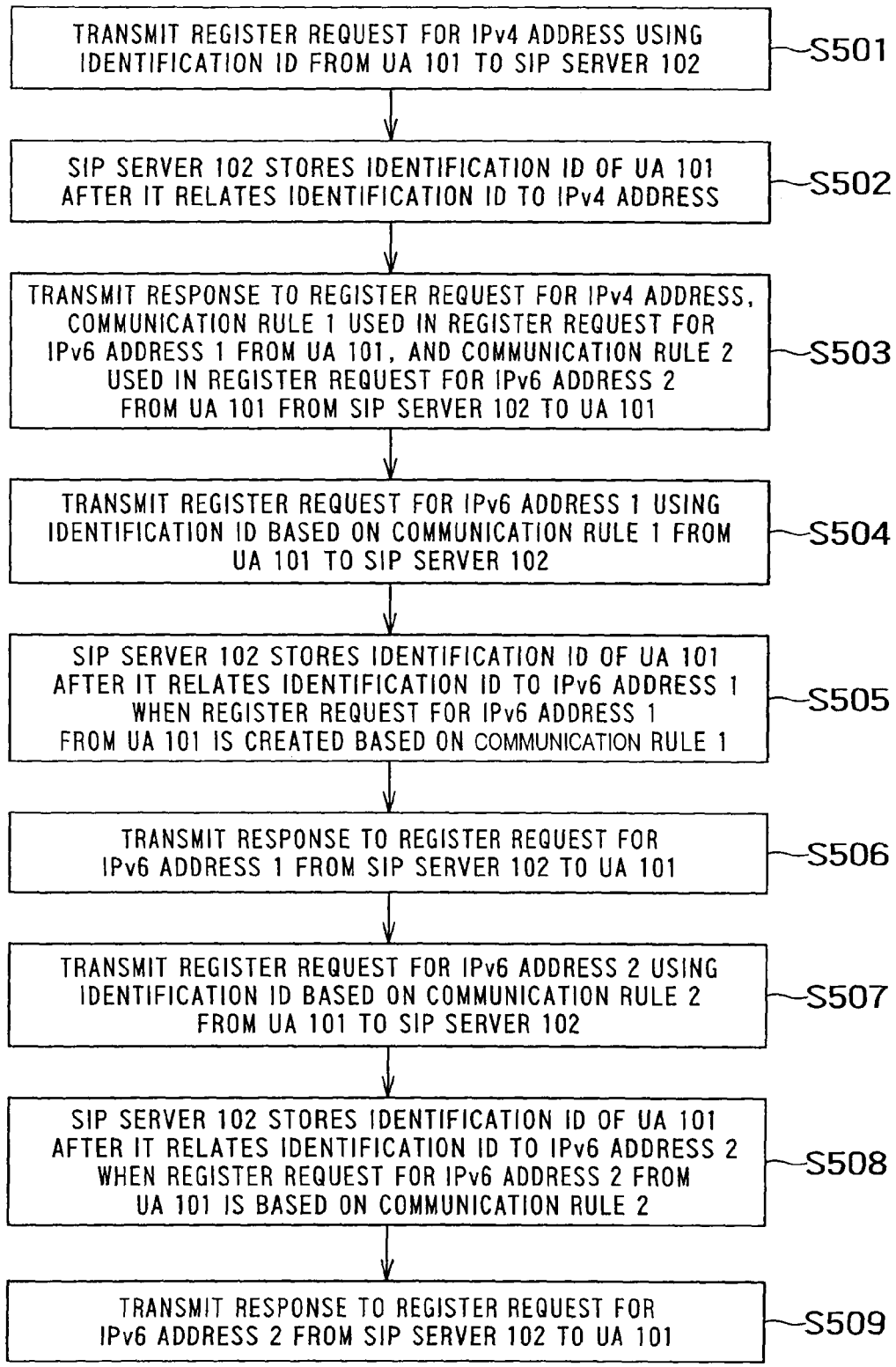
FIG. 7 is a flowchart showing the operation of the communication system according to a modification of the second embodiment.

Note that, in the second embodiment described above, the communication rule 2 in the REGISTER request for the IPv6 address 2 issued by the UA 101 is transmitted from the SIP server 102 to the UA 101 at step S406 when the response to the REGISTER request for the IPv6 address 1 is transmitted. However, it is also possible to transmit the communication rule 2 from the SIP server 102 to the UA 101 together with the communication rule 1 at step S503 when the response to the REGISTER request for the IPv4 address from the UA 101 is transmitted as shown in a flowchart of FIG. 7.

Further, the above second embodiment describes the case in which the UA 101 has the three protocol addresses. However, even when the UA 101 has four or more protocol addresses, it is possible to register the identification ID and the respective protocol addresses to the protocol address management table of the SIP server 102 after they are related to each other by the same operation only when the REGISTER requests for the respective protocol addresses are issued by the same UA.

That is, the UA 101 issues the REGISTER request for an $i^{th}$ protocol address to the SIP server 102, and when a response to the REGISTER request is transmitted, a communication rule, on which the UA 101 is to be based when it issues the REGISTER request for an $i+1^{th}$ protocol address, is transmitted from the SIP server 102 to the UA 101. The UA 101 transmits the REGISTER request for $i+1^{th}$ protocol address to the SIP server 102 based on the communication rule.

Otherwise, it is also possible to transmit all the communication rules, on which the UA 101 is to be based when it issues the REGISTER requests for the other protocol addresses owned thereby, from the SIP server 102 when a response to the REGISTER request for an initial protocol address REGISTER request from the UA 101 is transmitted and to transmit the REGISTER requests for the respective protocol addresses based on the communication rules from the UA 101 to the SIP server 102.

It should be noted that, in this case, it is not necessary for the SIP server 102 to grasp all the protocol addresses owned by the UA 101, and it is sufficient for the SIP server 102 to transmit the communication rules of the protocol addresses that may be owned by the UA 101. Then, it is sufficient for the UA 101 received the communication rules from the SIP server 102 to issue REGISTER requests to the SIP server 102 as to only the protocol addresses owned by the UA 101 itself based on the communication rules and to revoke the communication rules of the protocol addresses other than those owned by the UA 101 itself.

According to the second embodiment, when the REGISTER request for a first protocol address is issued from a communication terminal having a plurality of protocol addresses, a register server transmits a communication rule, on which the communication terminal is to be based in the REGISTER request for a second protocol address, to the communication terminal. Then, when the REGISTER request for the second protocol address is issued based on the communication rule, the register server stores the identification ID of the communication terminal and the second protocol address to a register table after it relates the identification ID to the protocol address. In this case, only the communication terminal that transmitted the first protocol address can know the communication rule for the REGISTER request for the second protocol address. Accordingly, only the communication terminal can register the second protocol address after it relates the address to the identification ID thereof. That is, it can be prevented to assume to the register server as if the protocol addresses of a plurality of different communication terminals belong to the same one communication terminal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiple protocol address register method between a register server and a communication terminal, which has an identification used to access the register server, comprising:
    transmitting a first register request, for requesting to register an Internet Protocol Version 4 (IPv4) address for an IPv4 protocol using the identification of the communication terminal, from the communication terminal to the register server;
    storing the IPv4 address and the identification to the register table of the register server, the IPv4 address being related to the identification;
    setting a first communication rule at the register server, the first communication rule describing how a second register request for requesting to register an Internet Protocol Version 6 (IPv6) address for an IPv6 protocol of the communication terminal has to be generated;
    transmitting a response to the first register request from the register server to the communication terminal, the response including an indication that the IPv4 address is registered at the register server, and including the first communication rule;
    transmitting the second register request from the communication terminal to the register server generated on the basis of the received first communication rule;
    storing, after confirming that the second register request is created based on the first communication rule, the IPv6 address to the register table of the register server, the IPv6 address being related to the same identification; and
    transmitting a response to the second register request from the register server to the communication terminal to confirm registration of the IPv6 address.

2. The multiple protocol address register method according to claim 1, wherein:
    the transmitting the response to the second register request includes transmitting the response together with a second communication rule, which must be applied to the communication of a third register request for requesting to register a global address of the communication terminal, the protocol of the global address being different from those of the IPv4 and the IPv6 addresses,
    the method further comprises:
    transmitting the third register request from the communication terminal to the register server on the basis of the second communication rule; and
    storing, when the third register request is created based on the second communication rule, the global address to the register table of the register server, the global address is related to the same identification.

3. The multiple protocol address register method according to claim 1, wherein:
    the transmitting the response to the first register request includes transmitting the response together with a second communication rule, which must be applied to the communication of a global address of the communication terminal, the protocol of the global address being different from those of the IPv4 and the IPv6 address,
    the method further comprises:
    transmitting a third register request from the communication terminal to the register server on the basis of the second communication rule; and
    storing, when the third register request is created based on the second communication rule, the global address to the register table of the register server, the global address is related to the same identification.

4. The multiple protocol address register method according to claim 1, wherein:
    the transmitting the first register request includes transmitting together a third communication rule, which must be applied to the communication of the response to the second register request, and
    the transmitting the response to the second register request is performed on the basis of the third communication rule.

5. The multiple protocol address register method according to claim 1, wherein:
    the IPv4 address is a local address used on a local network to which the communication terminal is connected; and
    the transmitting the first register request is performed after the IPv4 address is converted into a global address.

6. The multiple protocol address register method according to claim 1, further comprising:
    transmitting and receiving a signal for maintaining a communication only by a communication channel corresponding to the IPv4 address or to the IPv6 address between the communication terminal and the register server after the IPv4 address and the IPv6 address are registered to the register server.

7. The multiple protocol address register method according to claim 1, wherein the first communication rule is an encryption method used on the second register request.

8. A multiple protocol address register method between a register server and a communication terminal, which has an identification used to access the register server, comprising:
    setting a first communication rule at the communication terminal, the first communication rule describing how a second register request for requesting to register an Internet Protocol Version 6 (IPv6) address for an IPv6 protocol of the communication terminal has to be generated;
    transmitting a first register request, for requesting to register an Internet Protocol Version 4 (IPv4) address for an IPv4 protocol using the identification of the communication terminal, from the communication terminal to the register server together with the communication rule;
    storing the IPv4 address and the identification to the register table of the register server, the IPv4 address being related to the identification;
    transmitting a response to the first register request from the register server to the communication terminal;
    transmitting the second register request from the communication terminal to the register server;
    storing the IPv6 address and the same identification to the register table of the register server, the IPv6 address being related to the same identification; and
    transmitting a response to the second register request, the response created based on the first communication rule from the register server to the communication terminal to confirm registration of the IPv6 address.

9. A multiple protocol address register method between a SIP (Session Initiation Protocol) server including at least a register server and a user agent, which has an identification used to access the SIP server, comprising:

transmitting a first register request, for requesting to register an Internet Protocol Version 4 (IPv4) address for an IPv4 protocol using the identification of the user agent, from the user agent to the SIP server;

storing the IPv4 address and the identification to the register table of the SIP server, the IPv4 address being related to the identification;

setting a first communication rule at the SIP server, the first communication rule describing how a second register request for requesting to register an Internet Protocol Version 6 (IPv6) address for an IPv6 protocol of the user agent has to be generated;

transmitting a response to the first register request from the SIP server to the user agent together with the first communication rule, the response including an indication that the IPv4 address is registered at the SIP server and including the first communication rule;

transmitting the second register request from the user agent to the SIP server generated on the basis of the received first communication rule;

storing, after confirming that the second register request is created based on the first communication rule, the IPv6 address to the register table of the SIP server, the IPv6 address being related to the same identification; and transmitting a response to the second register request from the SIP server to the user agent to confirm registration of the IPv6 address.

10. A multiple protocol address register system comprising a register server and a communication terminal, which has an identification used to access the register server, the communication terminal comprising:

a memory storing an Internet Protocol Version 4 (IPv4) address and an Internet Protocol Version 6 (IPv6) address for an IPv4 and an IPv6 protocol, respectively;

a transmitter transmitting a first register request, for requesting to register an IPv4 address using the identification, from the communication terminal to the register server;

a receiver receiving a response to the first register request from the register server to the communication terminal, after the register server has set a first communication rule, the first communication rule describing how a second register request for requesting to register an IPv6 address for an IPv6 protocol of the communication terminal has to be generated, the response received together with the first communication rule, wherein the transmitter of the communication terminal transmits the second register request from the communication terminal to the register server generated on the basis of the first communication rule, and the register server comprising:

a receiver receiving the first register request transmitted from the communication terminal;

a memory storing the IPv4 address and the identification to the register table, the IPv4 address being related to the identification;

a setting unit for setting the first communication rule at the SIP server;

a transmitter transmitting a response to the first register request from the register server to the communication terminal together with the first communication rule, wherein the receiver of the register server receives the second register request, the memory of the register server stores, after confirming that the second register request is created based on the first communication rule, the IPv6 address and the same identification to the register table, the IPv6 address being related to the same identification, and the transmitter of the register server transmits a response to the second register request from the register server to the communication terminal to confirm registration of the IPv6 address.

11. The multiple protocol address register system according to claim 10, wherein:

the transmitter of the register server transmits the response to the second register request together with a second communication rule, which must be applied to the communication of a third register request for requesting to register a global address of the communication terminal, the protocol of the global address being different from those of the IPv4 and IPv6 protocol address, the transmitter of the communication terminal transmits the third register request from the communication terminal to the register server on the basis of the second communication rule, and when the third register request is created based on the second communication rule, the memory of the register server stores the global address in the register table, the global address being related to the same identification.

12. The multiple protocol address register system according to claim 10, wherein:

the transmitter of the register server transmits the response to the first register request together with a second communication rule, which must be applied to the communication of a third register request for requesting to register a global address of the communication terminal, the protocol of the global address being different from those of the IPv4 and IPv6 protocol address, the transmitter of the communication terminal transmits the third register request from the communication terminal to the register server on the basis of the second communication rule, and when the third register request is created based on the second communication rule, the memory of the register server stores the global address in the register table, the global address being related to the same identification.

13. The multiple protocol address register system according to claim 10, wherein:

the transmitter of the communication terminal transmits the first register request together with a third communication rule, which must be applied to the communication of a response to the second register request, the transmitter of the register server transmits the response to the second register request on the basis of the third communication rule.

14. The multiple protocol address register system according to claim 10, wherein:

the IPv4 address is a local address used on a local network to which the communication terminal is connected, the communication terminal has an address converter converting the IPv4 address into a global address when the first register request is transmitted from the communication terminal to the register server.

15. The multiple protocol address register system according to claim 10, wherein the first communication rule is a session description for communication used for the second register request.

16. A multiple protocol address register server comprising:

a receiver receiving a first register request for requesting to register an Internet Protocol Version 4 (IPv4) address for an IPv4 protocol transmitted from a communication terminal;

a memory storing the IPv4 address and an identification of the communication terminal to the register table, the IPv4 address being related to the identification;

a setting unit for setting a first communication rule at the register server, the first communication rule describing how a second register request for requesting to register an Internet Protocol Version 6 (IPv6) address for an IPv6 protocol of the communication terminal has to be generated;

a transmitter transmitting a response to the first register request from the register server to the communication terminal together with the first communication rule, the response including an indication that the IPv4 address is registered at the register server, wherein the receiver receives the second register request transmitted from the communication terminal, the memory stores, after confirming that the second register request is created based on the first communication rule, the IPv6 address and the same identification to the register table, the IPv6 address being related to the same identification, and the transmitter transmits a response to the second register request from the register server to the communication terminal to confirm registration of the IPv6 address.

17. A multiple protocol address communication terminal comprising:

a memory storing an Internet Protocol Version 4 (IPv4) address and Internet Protocol Version 6 (IPv6) address for an IPv4 protocol and an IPv6 protocol, respectively, and storing an identification used to access a register server, the IPv6 address being different from the IPv4 address;

a transmitter transmitting a first register request from the communication terminal to the register server for requesting to register an IPv4 address using the identification of the communication terminal, the IPv4 address being related to the identification;

a receiver receiving a response to the first register request from the register server together with a communication rule after the IPv4 address has been registered at the register server, the communication rule generated by the register server and describing how a second register request for requesting to register the IPv6 address of the IPv6 protocol of the communication terminal has to be generated, wherein the transmitter transmits the second register request from the communication terminal to the register server for requesting registration of the IPv6 address, the second register request generated on the basis of the received communication rule.

18. The multiple protocol address register method according to claim 1, wherein the response that is transmitted after the first register request sends the first communication rule including an encryption method and a key word for the encryption method to the communication terminal.

19. The multiple protocol address register server according to claim 16, wherein the response that is transmitted after the first register request sends the first communication rule including an encryption method and a key word for the encryption method to the communication terminal.

* * * * *